United States Patent [19]

Agarwal et al.

[11] 4,361,672

[45] Nov. 30, 1982

[54] HOT MELT ADHESIVE COMPOSITIONS

[75] Inventors: Pawan K. Agarwal, Westfield, N.J.;
Vincent L. Hughes, Baton Rouge, La.; Robert D. Lundberg, Bridgewater, N.J.

[73] Assignee: Exxon Research and Engineering Co., Florham Park, N.J.

[21] Appl. No.: 319,700

[22] Filed: Nov. 9, 1981

[51] Int. Cl.³ .............................................. C08G 18/00
[52] U.S. Cl. .................................... 525/54.5; 524/62; 524/66; 524/68; 524/71; 524/483
[58] Field of Search ................... 525/54.5; 524/62, 66, 524/68, 71, 483

[56] References Cited

U.S. PATENT DOCUMENTS 3,767,608 10/1973 Hand ...................... 524/62
3,801,531 4/1974 Berejka et al. .................. 524/490

Primary Examiner—Melvyn I. Marquis
Attorney, Agent, or Firm—Richard E. Nanfeldt

[57] ABSTRACT

This invention relates to hot melt adhesive compositions which includes a hydrogenated block copolymer block such as Kraton G, about 25 to about 250 parts by weight of a hydrocarbon resin made from a petroleum or coal tar distillate, aliphatic dienes and mono and diolefins, cyclic olefins of 5 to 6 carbon atoms and hydrogenated polycyclics per 100 parts by weight of the hydrogenated block copolymer, and about 25 to about 200 parts by weight of a polybutene or polyisobutylene per 100 parts of the hydrogenated block copolymer.

3 Claims, No Drawings

HOT MELT ADHESIVE COMPOSITIONS

BACKGROUND OF THE INVENTION

This invention relates to hot melt adhesive compositions which includes a hydrogenated block copolymer such as Kraton G, about 25 to about 250 parts by weight of a hydrocarbon resin of a petroleum or coal tar distillate, aliphatic dienes and mono and diolefins, cyclic olefins of 5 or 6 carbon atoms and hydrogenated polycyclics per 100 parts by weight of the hydrogenated block copolymer, and about 25 to 200 parts by weight of a polybutene or polyiso-butylene per 100 parts of the hydrogenated block copolymer.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Beside this energy requirement for the formation of the bond, there is another complication with the use of water based adhesive. For a uniform coating a good uniform wetting of the substrate surface is desired, which is not easily achieved.

With the solvent-based adhesives usually a good wetting is achieved; however, their use has been becoming extremely restrictive due to expensive energy requirements for the evaporation of organic solvents, fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

Recently the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they contribute (i) good tackifying characteristics for the polymer, (ii) good physical properties, e.g., good tensile strength at ambient conditions for the formulations, and (iii) reduction in the viscosity at fabrication temperatures.

Certain commercial block copolymers such as Shell's Kraton, Phillip's Solprene and DuPont's EVA copolymers attain the above objectives to a good extent. The adhesives prepared from blends incorporating these polymers have very good adhesive and strength properties at room temperature and can be processed by conventional melt coating and extrusion techniques because of their good flow characteristics. Because of this excellent combination of properties exhibited by ABA type when B represents a polydiene or a polyolefin block and A represents a polystyrene block, the use of Kratons at present in the industry for various pressure sensitive adhesive applications is growing.

However, the conventional block copolymers which are currently being used in adhesives technology, because of their inherent structure, have one serious drawback with respect to their use as a satisfactory adhesive candidate. Most of the conventional Kraton polymers are block copolymers of polystyrene and a polydiene. The polydiene component in Kratons (of industrial interest) is either polybutadiene or polyisoprene. Since both polybutadiene and polyisoprene are highly unsaturated, the Kraton block copolymers comprising either one of these two polymers are highly susceptible to thermal and oxidative degradation. This imposes many constraints on the adhesive users. For example, in order to minimize the degradation presently most often a packaging or a sealant adhesive user has to keep an inert blanket over the adhesive compound not only during formulation and processing which is usually done at somewhat elevated temperatures, but during storage as well. This becomes not only expensive, but at times cumbersome for the packager. Another point of caution experienced with the use of Kratons in adhesives is that the long term end use properties of the final product are highly susceptible to degradation due to UV light.

In order to circumvent these undesired properties of adhesives prepared using Kraton block copolymers, steps to modify the structure of these polymers have been taken. Recently Shell has invented and developed a new generation of Kraton block copolymers in which the mid unsaturated blocks of either polybutadiene or polyisoprene are hydrogenated to yield a saturated mid block. The saturated mid block is stable not only from a processing point of view, but from UV light during storage and use as well. In practice so far it has been found that these new saturated mid block Kraton polymers are difficult to tackify. We have found that certain blends of saturated Kratons when incorporated in certain proportions with selected Escorez resins together with relatively low molecular weight polybutenes such as Amoco's Indopol resins and yield systems which have very good tackifying characteristics. The aggresiveness of tack and other properties of these tertiary blends can be controlled by using carefully selected proportions of these blending ingredients and/or by incorporating certain fillers and plasticizers. All of these blends are mechanically compatible and have good flow properties as judged during milling. They can also be applied from solution if it is deemed necessary for other processing reasons.

The excellent thermal stability inherent in the saturated backbone of Kraton G is a very desirable property for adhesives which will be exposed to high temperatures for long times. Most adhesives based on other unsaturated elastomeric backbones can suffer degradation easily under those conditions.

SUMMARY OF THE INVENTION

This invention relates to hot melt adhesive compositions, which includes a hydrogenated block copolymer such as Kraton G; about 25 to about 250 parts by weight of a hydrocarbon resin of a petroleum or coal tar distillate, aliphatic dienes and mono and diolefins, cyclic olefins of 5 or 6 carbon atoms and hydrogenated polycyclics per 100 parts by weight of the hydrogenated block copolymer and about 25 to about 200 parts by weight of a polybutene or polyisobutylene per 100 parts of the hydrogenated block copolymer.

GENERAL DESCRIPTION

The present invention relates to unique and novel hot melt adhesive compositions which comprise a blend of a hydrogenated block copolymer, a polybutene or polyisobutylene and a hydrocarbon resin, wherein to the compositions can be optionally added an oil, and/or a filler thereby modifying the rheological and physical properties of the hot melt adhesive compositions.

A. Hydrogenated Block Copolymers

The hydrogenated block copolymers of the instant compositions are block copolymers of polystyrene and a polydiene which is typically selected from the group consisting of polybutadiene and polyisoprene, wherein the unsaturated mid block of either polybutadiene or polyisoprene are hydrogenated to yield a saturated mid block. As examples, hydrogenated block copolymers are manufactured by Shell Chemical Company and sold under the trade name: Kraton-G. The hydrogenated block copolymers have an Mn as measured of GPC of about 25,000 to about 300,000, more preferably about 30,000 to about 200,000, and most preferably about 50,000 to about 150,000.

B. Polybutene or Polyisobutylenes

Any low molecular weight polybutene polymer having a molecular weight in the range of 500 to 50,000 in appropriate portions could be used. The polybutene used in the present invention were polybutene, Oranite 32 and Oranite 128; also Indopol H-1900 which is quite similar to Oranite 128 and is produced by Amoco. Such polybutenes are composed predominantly of high molecular weight mono-olefins (85-98%) whose olefin structure is predominantly the trisubstituted type (R—CH=CR$_2$). The major component of polybutenes can be readily represented by polyisobutylene structure, and because of this similarity of polybutenes and polyisobutylenes, various grades of polyisobutylenes manufactured by various Chemical companies could be used. A blend incorporating Exxon's Vistanex-LM (Blend No. 134-2 of Table 3) was prepared for illustrative purposes. The properties of this blend, as can be seen from Table 4, are very similar to those prepared by Amoco polybutenes. As well known to those who are familiar with the art, the aggressiveness of tack and properties of most of these adhesive blends can be controlled by suitable control of the amount and type of the various ingredients used and/or by addition of effective external plasticizers.

The polybutene or polyisobutylene is incorporated into the hot melt adhesive composition at a concentration level of about 25 to about 200 parts by weight of the polybutene or polyisobutylene per 100 parts by weight of the hydrogenated block copolymer, more preferably about 50 to about 100, and most preferably about 60 to about 90.

C. Commercial Tackifier Resins

To the hot melt adhesive composition is added a commercial tackifying resin having a softening point of about 0° to about 160° C., more preferably about 50° to about 140° C. and most preferably about 70° to 120° C. A variety of commercial tackifier resins are available. Some of these resins contain α and/or β pinene base polyterpene resins as the main ingredient while others are derived from the polymerization of petroleum of coal distillates which consist of aliphatic dienes, mono- and di-olefins and cyclic olefins having about 5 to about 6 carbon atoms. The latter type of tackifiers have primarily piperylene and/or isoprene structure. A general but excellent description of tackifying resins derived from Petroleum derivatives can be found in, for example, *Encyclopedia of Polymer Science and Technology*, Vol. 9, Pages 853 to 860, chapter by John Findlay, Published by John Wiley & Sons, NY (1968).

Typical but non-limiting tradenames of these commercial tackifiers are Wingtack of Goodyear, Escorez of Exxon, Piccolyte of Hercules and Zonrez of Arizona Chemicals. Recently these and various other companies have also started marketing relatively higher softening points resins and very light colored resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads the number average molecular weight Mn from about 300 to about 5000 and more preferably about 500 to about 2000 and most preferably about 700 to 1600.

Frequently it is desirable to enhance the clear, colorless appearance of the saturated mid block Kraton polymers by using the colorless resins, e.g., hydrogenated resins such as Escorez 5380 and Escorez 5320 of Exxon Chemical Co. U.S.A. Formulations made from these compounds and, preferably, low color polybutenes form desirable, tacky, almost colorless and aesthetically pleasing adhesives.

These hydrocarbon tackifier resins are incorporated into the hot melt adhesive composition at about 50 to about 150 parts by weight per 100 parts by weight of the hydrogenated block copolymer, more preferably about 60 to about 125 and most preferably about 75 to about 100.

D. Method of Forming Blend Adhesive Composition

The blend compositions of the hydrogenated block copolymer, the polybutene or polyisobutylene and the hydrocarbon tackifier resin can be formed by techniques well known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrell Continuous Mixer, a twin screw extruder, or tandem extrusion techniques which are continuous mixing types of equipment. The Banbury mixing device is the preferred batch type mixer, and the twin screw extruder is the preferred continuous mixer. Alternatively, if suitable mixing equipment is not available, the mixtures can be dissolved in suitable hydrocarbon organic solvents such as toluene and heptane, taking care to form homogeneous solutions that are then coated on film backing before the solvent is evaporated.

E. Extended Blend Adhesive Composition

To the blend composition of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 1 to about 150 parts by weight per 100 parts by weight of the hydrogenated block copolymer, more preferably at about 20 to about 150; and most preferably at about 30 to about 100. Typically, these fillers have a particle size of about 0.3 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

F. Oil Extended Adhesive Compositions

It is observed that the blend composition of the instant invention can also include oils to further improve low temperature properties and tack characteristics of the resulting adhesive levels of oil of less than about 25 parts by weight per 100 parts of the hydrogenated block copolymer can be incorporated, more preferably about 1 to about 20 parts. Oils are particularly useful when high levels of petroleum resins tackifiers are used since such materials can harden the resulting composition. Oils can usually further soften and reduce the cost. In some cases, oils can significantly contribute to the degree of tackiness of the final product and thus are helpful in formulating various adhesive products. Typical oils that can be used may be low viscosity aromatic, naphthenic or paraffinic petroleum oils, having less than 2 weight percent polar type compounds. Typical oils are illustrated in Table II.

G. Method of Fabrication of Adhesive Compositions

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which would be paper, cloth, aluminum foil or glass fabric. The temperature and the throughput of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terphthalic acid, vinyl such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood and finally sheets or strips of metals such as steel, copper, aluminum, and alloys thereof can also be employed. In general, the backing employed are those which have been heretofore been conventionally employed in preparing pressure sensitive labels, tapes, sheetings and the like and the selection of any particular substrate material is not a specific novel feature of the present invention.

DETAILED DESCRIPTION OF THE INVENTION

The advantages of the hot melt compositions of the present invention can be more readily appreciated by reference to the following examples and tables. Unless otherwise specified, all measurements are in part per hundred by weight.

EXAMPLE 1

TABLE I

| Filler | Code # | of oil/100 grams of filler | Specific Gravity | Avg. Particle Size Micron | pH |
| --- | --- | --- | --- | --- | --- |
| Calcium Carbonate Ground | Atomite | 15 | 2.71 | | 9.3 |
| Calcium Carbonate Precipitated | Purecal U. | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

TABLE II

| Type Oil | Oil Code # | Viscosity ssu | Mn | % Polars | % Aromatic | % Saturate |
| --- | --- | --- | --- | --- | --- | --- |
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

In first series of tests, various typical binary adhesive blends of Kraton G polymer and commercial tackifying resins were made. The composition of these blends are shown in Table 1 and various adhesive properties are shown in Table 2. From Table 2, it is noticed that these blends give respectable properties with respect to, for example, compatibility, green strength, bond strength, etc. These materials also appear to have low melt viscosities at typical processing temperatures as was observed during their hot mill rolling. The ease in milling also suggests that they have good processing characteristics as well. However, as can be readily observed from the last column of Table 2, these blends are very poor in regard to their tacky nature. Blends 24-1, 24-3 and 24-5 are dry; blends 24-2, 24-4 and 24-6, wherein the loading of the resin was increased by 40% from their respective blends (1, 3 and 5) show only slight improvements. These blends, although, do exhibit a very slight degree of tack in the melt state, but nonetheless they exhibit far lower tack values at room temperatures than the values typically demanded from the industrial applications viewpoint.

Kraton G and resins. For example, compare Blend Nos. 24-2, 24-4, 24-6 of Table 2 with Blend Nos. 132-10, 133-2 and 133-4 of Table 4.

TABLE 2

QUALITATIVE AND QUANTITATIVE ADHESIVE PROPERTIES OF BINARY BLENDS OF TABLE 1
1.5 Mil Films Made From Toluene Solutions of Elastomer, etc.

| Blend No. | Glass Transition Temp. (Rubbery Phase) | Rolling Ball, Cm Initial | Rolling Ball, Cm 1 day @ 158° F. | 180° Peel Initial | 180° Peel 1 day @ 158° F. | 90° Quick Stick Initial | 90° Quick Stick 1 day @ 158° F. | Bond Strength (lbs.) | Mode of Failure* | Tackiness** |
|---|---|---|---|---|---|---|---|---|---|---|
| 24-1 | −31° C. | 20 | 25.8 | 1.2 | 0.9 | 0.2 | 0.2 | 1.5 | A.F. | Non-Tacky |
| 24-2 | −19° C. | 30 | 30 | 2.4 | 2.1 | 0.8 | 2.0 | 3.0 | A.F. | Very Slightly Tacky |
| 24-3 | −33° C. | 6.8 | 6.6 | 0.6 | 0.7 | 0.5 | 0.7 | 2.1 | A.F. | Non-Tacky |
| 24-4 | −25° C. | 13.8 | 12.7 | 2.5 | 2.0 | 1.1 | 1.5 | 4.1 | A.F. | Very Slightly Tacky |
| 24-5 | −37° C. | 12.6 | 30 | 1.5 | 2.6 | 0.8 | 1.0 | 2.6 | A.F. | Non-Tacky |
| 246 | −21° C. | 10.2 | 30 | 0.9 | 1.2 | 0 | 1.0 | 4.7 | A.F. | Very Slightly Tacky |

*A.F. - adhesive failure
**Subjective qualitative test as judged/felt by the technician by touching the final product by his clean fingers

TABLE 1

COMPOSITION OF BINARY BLENDS OF KRATON G AND TACKIFYING RESINS

| Blend No. | 24-1 | 24-2 | 24-3 | 24-4 | 24-5 | 24-6 |
|---|---|---|---|---|---|---|
| Kraton G | 100 | 100 | 100 | 100 | 100 | 100 |
| Escorez 1310 | 60 | 100 | — | — | — | — |
| Escorez 5380 | — | — | 60 | 100 | — | — |
| Arkon P-85 | — | — | — | — | 60 | 100 |
| Irganox | 1 | 1 | 1 | 1 | 1 | 1 |

EXAMPLE 2

Since binary blends of Kraton G polymer and tackifying resins failed to show any respectable degree of tackiness, attempts were made to make tertiary blends of Kraton G, tackifying resins and polybutenes.

In Table 3 various tertiary (adhesive) blend compositions of Kraton G system are shown. In this series of experiments, it can be seen that beside Kraton G and tackifying resins, as used previously in Table 1, a third component, a low molecular weight polymer, polybutene, was added. All the blends incorporating polybutene were compatible. Blend No. 132-11, which is a binary blend of Kraton G and a polybutene (H-1900), is included here in this table for comparative purposes. This blend in its physical characteristics is more or less similar to various binary blends of Table 1. However, because of the low molecular weight nature of polybutene, the blend No. 132-11 is somewhat poor in its green strength as compared to blends of Table 1 having similar compositions.

Table 4 illustrates the properties of various blends of Table 3. It is clear from the last column of Table 4 that all the blends exhibit significant improvements in their tackiness upon incorporation of polybutene. The addition of an equal amount of polybutene, as that of Escorez or Arkon resins used in formulating the adhesive blends of Table 1, improves significantly the tack of the product. This is especially true for 50—50 blends of The exact and detailed procedure for preparing the blends of above and following Tables is not a crucial component of the present invention. The blends could either be prepared by hot mill mixing via suitable polymer processing units such as roll mill, brabender, etc., or the blends in lab (in the absence of such units) could easily be prepared by dissolving the desired quantities of various ingredients in a suitable organic solvent.

The bond strength values reported in Tables 2 and 4 were obtained by a method similar to ASTM D-429 adhesion tests. In brief, the samples were sandwiched between mylar sheets and pressed to a thickness of about 25 mils using a hot press. Rectangular strips of ½ inch width and 3 inches long were cut and 90° peel tests were performed on an Instron at room temperature. The resin-free sections of the mylar film were clamped into air jaws to avoid any slippage during pulling. The samples were pulled at 5 inches/minute crosshead speed. The force and elongation of the samples were recorded on a strip recorder. The force necessary to separate the mylar sheets was taken as the bond strength of the blend and a measure of its cohesive strength and adhesive nature. The final plateau values are reported. The qualitative nature of the tackiness of the blends were determined by technician's subjective "finger test" method.

TABLE 3

COMPOSITION OF TERTIARY BLENDS OF KRATON G, TACKIFYING RESINS, AND LOW MOLECULAR WEIGHT POLYBUTENES

| Blend Number | 132-10 | 132-11* | 133-1 | 133-2 | 133-3 | 133-4 | 134-1 |
|---|---|---|---|---|---|---|---|
| Kraton G | 100 | 100 | 100 | 100 | 100 | 100 | 100 |
| Irganox | 1 | 1 | 1 | 1 | 1 | 1 | — |
| Escorez 1310 | 100 | — | — | — | — | — | 100 |
| Escorez 5380 | — | — | 60 | 100 | — | — | — |
| Arkon P-85 | — | — | — | — | 60 | 100 | — |
| Polybutene (H-1900)** | 100 | 100 | 100 | 100 | 100 | 100 | — |
| Vistanex LM*** | — | — | — | — | — | — | 100 |

*This binary blend is included here for comparative purposes (see text for details).
**Polyisobutylene, a product of Amoco.
***Polyisobutylene, a product of Exxon.
All these samples were melt mixed on a hot mill roll at about 150° C.

TABLE 4

QUALITATIVE AND QUANTITATIVE PROPERTIES OF BLENDS OF TABLE 3

| Blend Number | Bond Strength (lbs.) | Clarity* | Mode of Failure*** | Tackiness*** |
|---|---|---|---|---|
| 132-10 | 2.8 | Clear/Very Light Yellow** | A.F. | Tacky |
| 132-11 | 0.5 | Clear/Transparent | A.F. | Non-Tacky |
| 133-1 | 2.5 | Clear/Transparent | A.F. | Non-Tacky |
| 133-2 | 3.7 | Clear/Transparent | A.F. | Tacky |
| 133-3 | 2.4 | Clear/Transparent | A.F. | Very Slightly Tacky |
| 133-4 | 3.8 | Clear/Transparent | A.F. | Tacky |
| 134-1 | 1.7 | Clear/Very Light Yellow | A.F. | Slightly Tacky |

*Clarity of the film pressed in between mylar sheets.
**Due to the color of the resin.
***See footnotes of Table 2.

Kraton G is a block copolymer of the structure ABA in which A is a block of styrene (total 15% by weight) whose number average molecular weight is in the range of 10,000 to 30,000. B is a block of hydrogenated polybutadiene in polyisoprene (85%) having a number average molecular weight of about 125,000. Vistanex-LM is a low molecular polyisobutylene and is an Exxon proprietary material described in detail in various U.S. patents. Amoco polybutenes are viscous, non-drying, water white, liquid butylene polymers. They are composed predominantly of high molecular weight mono-olefins (85–98%), the balance being isoparaffinic. The major component of Amoco polybutenes can be represented by polyisobutylene structure. Arkon P-85 and Escorez resins are commercial tackifiers having a melting point in the neighborhood of 80°–90° C. These are hydrocarbon resins derived from petroleum or coal tar distillates, aliphatic dienes and mono-olefins of 5 or 6 carbon atoms.

EXAMPLE 3

In this series of tests, various binary blend compositions of Kraton G and tackifying resins incorporating two types of oils: Tufflo and Shellflex, as an example were prepared. The composition of such blends and various adhesive characteristics thereof are shown in Table 5. These tests were run with mylar coated sheets having 1–2 mil. films of adhesive on the plastic backing.

The tests used are those published by the Pressure Sensitive Tape Council (PSTC) and widely used in the adhesive industry. They are identified in the footnotes. It is observed that with no additives, which is especially true for low oil loadings, the films are dry. The films prepared from these compositions exhibit poor tack as determined by polyken tester. Only compositions having high levels of oil (50 phr) exhibit somewhat improved rolling ball tack but nevertheless, these compositions exhibit poor polyken peel and quick stick adhesive characteristics.

TABLE 5

COMPARISON OF OIL LEVEL ON KRATON G TACKIFICATION
1.5 Mil Film Made From Toluene Solutions of Elastomer etc.

| Resin Formulation | | | | | | | | | | | | | | |
|---|---|---|---|---|---|---|---|---|---|---|---|---|---|---|
| Kraton G-1657 | | | | | | | | 100 | | | | | | |
| Resin, phr | | | | | | | | | | | | | | |
| Escorez 5380 | 60 | 80 | 80 | 80 | 75 | 100 | 125 | — | — | — | — | — | — | — |
| Arkon P-85 | — | — | — | — | — | — | — | 60 | 80 | 80 | 80 | 75 | 100 | 125 |
| Additive | | | | | | | | | | | | | | |
| Tufflo G056 | 10 | 10 | 20 | — | 50 | 50 | 50 | 10 | 10 | 20 | — | 50 | 50 | 50 |
| Shellflex 371 | — | — | — | 20 | — | — | — | — | — | — | 20 | — | — | — |
| Adhesive Properties | | | | | | | | | | | | | | |
| Rolling Ball Tack, cm (b) | 14 | 10 | 9.5 | 10 | 5 | 8.5 | 15 | 12.5 | 30+ | 9.5 | 9.5 | 5 | 6 | 17 |
| Polyken Tack, gm/cm$^2$ (c) | (a) | (a) | (a) | (a) | 200 | 250 | 200 | (a) | (a) | (a) | (a) | 275 | 330 | 43 |
| 90° Quick Stick, lbs/in$^2$ (e) | 0.3 | 0.3 | 0.2 | 0.8 | 0.2 | 0.4 | 0.2 | 0.1 | 0.3 | 0.7 | 0.5 | 0.4 | 0.7 | 0.3 |
| Peel, lbs/in$^2$ (d) | — | 0.6 | 0.2 | 1.8 | 0.3 | 0.5 | 0.3 | 0.1 | 2.4 | 1.9 | 0.3 | 0.5 | 1.3 | 0.8 |

(a) Not measured. Dry or poor "finger tack".
(b) PSTC-6
(c) ASTM D-2979
(d) PSTC-1
(e) PSTC-5

EXAMPLE 4

Various adhesive blend compositions and their properties of this Example are shown in Table 6. In this case, again, the samples were prepared by adding a solution of the blend in toluene to mylar film forming a 5–10 mil. film with a blade drawn across the solution, and quickly entering an oven to evaporate the solvent, recovering a 1–2 mil. organic film with pressure sensitive adhesive properties. In these experiments, in some compositions of Table 6, an extra additive polybutene (Oranite 128) was added. As can be clearly seen that the addition of this ingredient inparts significant improvements in the adhesive properties of compositions of the previous Table. In particular, it is observed that the polyken tack is doubled from the previous compositions. The polybutene also improves the rolling ball tack.

TABLE 6
EFFECT OF POLYBUTENE ADDITIVES ON THE KRAT G TACKIFICATION

| PSA formulation | | | | | | | | | | |
|---|---|---|---|---|---|---|---|---|---|---|
| Kraton G-1657 | | | | | 100 | | | | | |
| Resin, phr | | | | | | | | | | |
| Escorez 5380 | 60 | 60 | 100 | 100 | 100 | — | — | — | — | — |
| Arkon P-85 | — | — | — | — | — | 60 | 60 | 100 | 100 | 100 |
| Escorez 1310 | — | — | — | — | — | — | — | — | — | — |
| Additive | | | | | | | | | | |
| Tufflo G056 (a) | — | 10 | — | 50 | — | — | 10 | — | 50 | — |
| Oranite 128 (b) | — | — | — | — | 50 | — | — | — | — | 50 |
| PSA Properties | | | | | | | | | | |
| Rolling Ball Tack, cm | 12 | 10 | 18 | 8.5 | 5.5 | 1.7 | 12.5 | 30+ | 6 | 13 |
| Polyken Tack gms/cm$^2$ | (c) | (c) | (c) | 250 | 585 | (c) | (c) | (c) | 330 | 700 |
| 90° Quick Stick lbs/in$^2$ | 0.6 | 0.3 | 1.3 | 0.4 | 1.1 | 1.4 | 0.6 | 0.6 | 0.7 | 1.8 |
| Peel lbs/in$^2$ | 1.0 | 0.5 | 2.3 | 0.5 | 2.6 | 2.3 | 0.1 | 1.4 | 1.3 | 2.7 |

(a) Napthenic Oil
(b) High molecular weight polybutene
(c) Not measured. Dry, poor "finger tack"

EXAMPLE 5

The data of these experiments are illustrated in Table 7 and 8. In Table 7, direct comparisons of oil containing adhesive blend compositions incorporating two different grades of polybutenes are shown. As seen is previous examples, it is observed that polybutene improves polyken tack, quick stick and peel strength of the adhesive compositions. Comparing the two polybutenes, it is noticed that the higher molecular weight polybutene is somewhat better in improving the tack characteristics than the low molecular weight polybutene in these formulations. In Table 8, comparative data of two tackifying resins differing in their softening point are shown. It is observed that the peel strength of these two types of blends is more or less equal. However, the low softening point resin sample tends to form compositions which are somewhat better in regard to their rolling ball tack. The other important point to note is that both resins respond to polybutenes better than oils (e.g. Example 3 and 4) as judged from the polyken test and quick stick measurements of these samples.

TABLE 7
COMPARISON OF TWO 85° C. SOFTENING POINT RESINS
1.5 Mil Film Made From Toluene Solutions of Elastomer etc.

| Resin Formulation | | | | | | | | | | | | |
|---|---|---|---|---|---|---|---|---|---|---|---|---|
| Kraton G-1657 | | | | | | 100 | | | | | | |
| Resin phr. | | | | | | | | | | | | |
| Escorez 5380 | 75 | 75 | 75 | 100 | 100 | 100 | — | — | — | — | — | — |
| Arkon P-85 | — | — | — | — | — | — | 75 | 75 | 75 | 100 | 100 | 100 |
| Additive | | | | | | | | | | | | |
| Oranite 32 (a) | 50 | — | — | 50 | — | — | 50 | — | — | 50 | — | — |
| Oranite 128 (b) | — | 50 | — | — | 50 | — | — | 50 | — | — | 50 | — |
| Tufflo G056 (c) | — | — | 50 | — | — | 50 | — | — | 50 | — | — | 50 |
| Adhesive Properties | | | | | | | | | | | | |
| Rolling Ball Tack, cm | 6 | 8 | 5 | 7.5 | 5.5 | 8.5 | 10 | 15 | 5 | 18 | 13 | 6 |
| Polyken Tack gm/cm$^2$ | 375 | 450 | 200 | 450 | 585 | 250 | 410 | 570 | 275 | 450 | 700 | 330 |
| 90° Quick Stick lbs/in$^2$ | 0.8 | 1.0 | 0.2 | 1.0 | 1.1 | 0.4 | 1.1 | 1.2 | 0.4 | 1.3 | 1.8 | 0.7 |
| Peel, lbs/in$^2$ | 1.4 | 2.0 | 0.3 | 2.3 | 2.6 | 0.5 | 1.7 | 2.4 | 0.5 | 2.3 | 2.7 | 1.3 |

(a) Low MW Polybutene
(b) High MW Polybutene
(c) Naphthenic Oil

TABLE 8
COMPARISON OF 85° C. AND 125° C. SOFTENING POINT RESINS
1.5 Mil Films Made From Toluene Solution of Elastomer etc.

| Resin Formation | | | | | | | | | | | | |
|---|---|---|---|---|---|---|---|---|---|---|---|---|
| Kraton G-1657 | | | | | | 100 | | | | | | |
| Resin, phr | | | | | | | | | | | | |
| Escorez 5380 (a) | 75 | 75 | 75 | 100 | 100 | 100 | — | — | — | — | — | — |
| Escorez 5320 (b) | — | — | — | — | — | — | 75 | 75 | 75 | 100 | 100 | 100 |
| Additive | | | | | | | | | | | | |
| Oranite 32 (c) | 50 | — | — | 50 | — | — | 50 | — | — | 50 | — | — |
| Oranite 128 (d) | — | 50 | — | — | 50 | — | — | 50 | — | — | 50 | — |
| Tufflo G056 (e) | — | — | 50 | — | — | 50 | — | — | 50 | — | — | 50 |
| Adhesive Properties | | | | | | | | | | | | |
| Rolling Ball Tack, cm | 6 | 8 | 5 | 7.5 | 5.5 | 8.5 | 11 | 23 | 6.8 | 30 | 30 | 12 |
| Polyken Tack gms/cm$^2$ | 375 | 450 | 200 | 450 | 585 | 250 | 480 | 600 | 251 | 500 | 740 | 345 |
| 90° Quick Stick lbs/in$^2$ | 0.8 | 1.0 | 0.2 | 1.0 | 1.1 | 0.4 | 0.7 | 1.4 | 0.3 | 1.4 | 1.8 | 0.4 |

TABLE 8-continued

COMPARISON OF 85° C. AND 125° C. SOFTENING POINT RESINS
1.5 Mil Films Made From Toluene Solution of Elastomer etc.

| Peel, lbs/in² | 1.4 | 2.1 | 0.3 | 2.3 | 2.6 | 0.5 | 1.9 | 1.3 | 0.4 | 1.4 | 2.2 | 1.3 |

(a) 85° C. Softening Point Resin
(b) 125° C. Softening Point Resin
(c) Low MW Polybutene
(d) High MW Polybutene
(e) Naphthenic Oil

What is claimed is:

1. A hot melt adhesive composition which comprises:
   (a) a hydrogenated block copolymer of polystyrene and a hydrogenated polydiene, said diene being selected from the group consisting of polybutadiene and polyisoprene;
   (b) about 25 to about 250 parts by weight of a hydrocarbon resin of a petroleum or coal tar distillate per 100 parts by weight of said hydrogenated block copolymer; and
   (c) about 25-200 parts by weight of polybutene or polyisobutylene per 100 parts of said hydrogenated block copolymer.

2. A hot melt adhesive composition according to claim 1 further including about 1 to about 150 parts by weight of a filler per 100 parts by weight of said hydrogenated block copolymer, said filler being selected from the group consisting of calcium carbonates, silicas, carbon blacks, clays and talcs and mixtures thereof and/or less than about 100 parts by weight of an oil having less than 2 weight percent polars per 100 parts by weight of said hydrogenated block copolymer.

3. A hot melt adhesive composition according to claim 1 or 2 wherein said hydrocarbon resin is made from monomers with 5 to 6 carbon atoms and consists of aliphatic dienes, mono and diolefins and cyclic olefins.

* * * * *